April 30, 1929.     L. DUBOIS     1,711,016
STONE SAWING MACHINE
Filed June 4, 1927
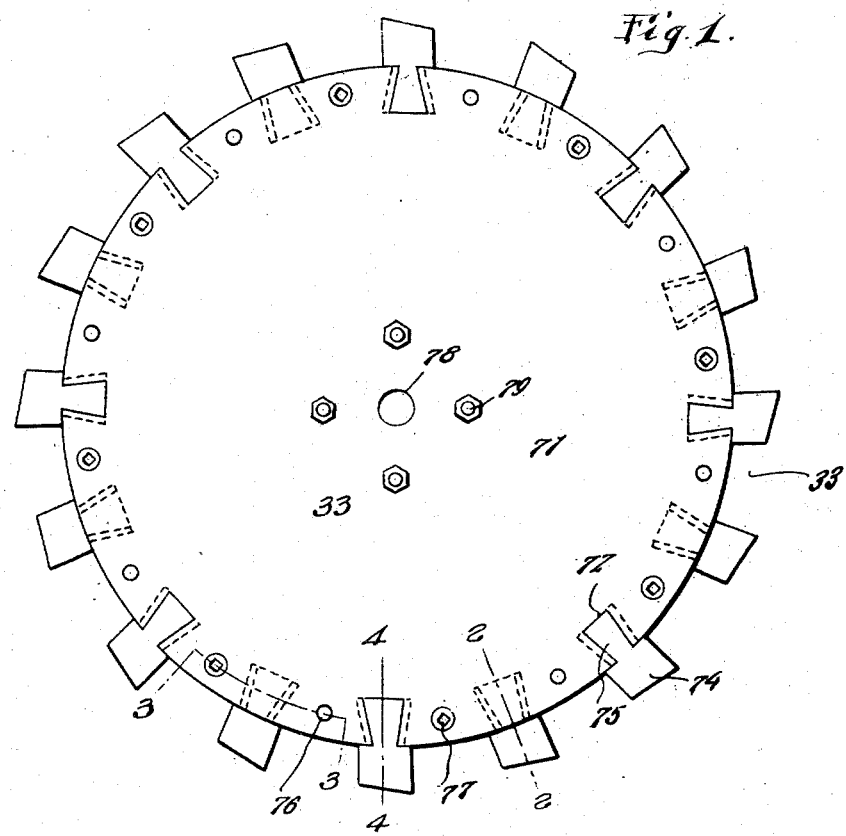
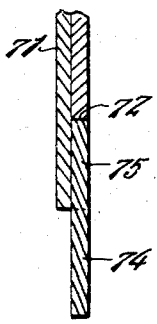
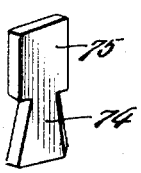
Lionel DuBois
INVENTOR
BY Victor J. Evans
ATTORNEY Patented Apr. 30, 1929.

1,711,016

UNITED STATES PATENT OFFICE.

LIONEL DUBOIS, OF NORTHFIELD, VERMONT.

STONE-SAWING MACHINE.

Application filed June 4, 1927. Serial No. 196,504.

This invention relates to improvements in sawing machines, an object being to provide a saw which is adapted for heavy work and is especially designed for sawing stone.

Another object of the invention is the provision of a saw blade which is especially adapted for sawing stone, novel means being provided for removably securing the teeth to the blade, so that the teeth may be conveniently removed and replaced and will be flush with the opposite faces of the blade.

With the above and other objects in view, the invention further includes the following novel features and details of construction, to be hereinafter more fully described, illustrated in the accompanying drawings and pointed out in the appended claim.

In the drawings:—

Figure 1 is an elevation of the saw.

Figure 2 is an enlarged fragmentary section on the line 2—2 of Figure 1.

Figure 3 is a fragmentary section on the line 3—3 of Figure 1.

Figure 4 is a detail view of one of the teeth.

Figure 5 is an enlarged fragmentary section on the line 5—5 of Figure 1.

The saw blade which is indicated by the reference character 33 is formed of a pair of disks 71 of like diameter. These disks are provided around their edges with dovetailed slots 72 whose opposite side edges are reversely beveled as shown at 73. The disks are secured together with the slots of the disks alternately arranged, so that circumferentially spaced peripherally offset sockets are provided with the sockets of one disk having their bottoms formed by the adjacent face of the other disk. These sockets receive shanks 74 of teeth 75, the shanks being of a thickness equal to the thickness of one of the disks and being shaped to snugly fit within the sockets. The disks are secured together by screws 76 having sockets 77 therein to receive a suitable tool. The disks may thus be separated for the removal of any of the teeth and re-assembled after the teeth have been replaced. By reference to Figures 2 and 5 of the drawings it will be seen that the teeth are flush with the opposite faces of the disks. The disks are provided with openings 78 to receive the arbor 31 and additional fastening devices or bolts 79 are passed through the disks adjacent this opening.

The invention is susceptible of various changes in its form, proportions and minor details of construction and the right is herein reserved to make such changes as properly fall within the scope of the appended claim.

Having described the invention what is claimed is:—

A rotary saw blade comprising a pair of disks of like diameter having spaced dovetailed slots therein with the side walls of the slots transversely and oppositely beveled, the slots of one disk being circumferentially spaced from the slots of the other disk to provide sockets, teeth adapted to extend from the edge of the blade, shanks upon the teeth, said shanks conforming to the shape of and fitting within the sockets and means to removably secure the disks together to removably secure the teeth to the blade.

In testimony whereof I affix my signature.

LIONEL DUBOIS.